United States Patent [19]
Keith et al.

[11] Patent Number: 6,115,655
[45] Date of Patent: Sep. 5, 2000

[54] METHOD FOR MONITORING AND REPORTING VEHICULAR MILEAGE

[76] Inventors: W. Curtis Keith, 1722 Staysail Dr., Valrico, Fla. 33594; Paul H. Evans, 51 Main St., Suite 7, Dunedin, Fla. 34698-5706

[21] Appl. No.: 09/014,483

[22] Filed: Jan. 27, 1998

[51] Int. Cl.[7] .................................................. G06F 17/00
[52] U.S. Cl. ............................ 701/35; 701/213; 701/211
[58] Field of Search ............................... 701/35, 213, 211

[56] References Cited

U.S. PATENT DOCUMENTS

| | | | |
|---|---|---|---|
| 4,258,421 | 3/1981 | Juhasz et al. | 364/424 |
| 5,014,206 | 5/1991 | Scribner et al. | 364/449 |
| 5,068,656 | 11/1991 | Sutherland | 340/989 |
| 5,231,584 | 7/1993 | Nimura et al. | 364/444 |
| 5,428,542 | 6/1995 | Liesveld | 364/424.04 |
| 5,532,690 | 7/1996 | Hertel | 340/989 |
| 5,543,802 | 8/1996 | Villevielle et al. | 342/357 |
| 5,612,875 | 3/1997 | Haendel et al. | 364/424.04 |
| 5,646,843 | 7/1997 | Gudat et al. | 701/3 |
| 5,719,771 | 2/1998 | Buck et al. | 455/456 |
| 5,802,492 | 9/1998 | DeLorme et al. | 455/456 |
| 5,844,473 | 12/1998 | Kaman | 340/439 |
| 5,916,300 | 6/1999 | Kirk et al. | 701/213 |
| 5,918,180 | 6/1999 | Dimino | 455/456 |
| 5,919,239 | 7/1999 | Fraker et al. | 701/35 |

*Primary Examiner*—William A. Cuchlinski, Jr.
*Assistant Examiner*—Olga Hernandez
*Attorney, Agent, or Firm*—David Kiewit

[57] ABSTRACT

A navigational system and a computer-based datalogger are used to store data on the distances traveled by and places visited by a monitored vehicle. The datalogger includes a clock and an on-board memory that can store time-stamped records of the latitude and longitude of places visited by the vehicle. In some such systems the vehicle operator can assign a label or a location classification to selected places that he or she visits. Additionally, in some versions of the system an administrator can use a central computer located at the vehicle's home base to assign labels to locations where the vehicle is expected to make a stop. The central computer generates a map-like graphical output that displays a point corresponding to each of the places visited. This display may also show the time spent at each place visited during an operational period.

10 Claims, 5 Drawing Sheets

| time | Lat | Long | Remark | Flag |
|---|---|---|---|---|
| 10:11 | 28:01:17 | 82:29:23 | | |
| 10:12 | 28:01:38 | 82:29:24 | sub shop | |
| 10:13 | 28:01:37 | 82:29:07 | | √ |
| 10:14 | 28:01:38 | 82:28:70 | | √ |
| 10:15 | 28:01:38 | 82:28:70 | | √ |
| 10:16 | 28:01:38 | 82:28:70 | | √ |
| ” | ” | ” | | √ |
| ” | ” | ” | | √ |
| 10:43 | 28:01:38 | 82:28:70 | | √ |
| 10:44 | 28:01:55 | 82:28:70 | | √ |
| 10:45 | 28:01:55 | 82:28:95 | | √ |

*FIG. 5*

METHOD FOR MONITORING AND REPORTING VEHICULAR MILEAGE

STATEMENT REGARDING FEDERALLY SPONSORED RESEARCH OR DEVELOPMENT

Not Applicable

CROSS REFERENCE TO RELATED APPLICATIONS

Not Applicable

BACKGROUND OF THE INVENTION

1. Field of the Invention

The invention relates to data processing systems employing a satellite navigation system, such as the Global Positioning System (GPS) for tracking places traveled to and distances traveled between a plurality of way points. A preferred embodiment of the system of the invention uses the GPS navigation system for recording and reporting business miles traveled in a vehicle used for both business and non-business purposes.

2. Description of Prior Art

In U.S. Pat. No. 4,258,421 Juhasz et al. provide seminal teaching of a vehicle monitoring system comprising a data processing unit for receiving and processing data relevant to the operation of the vehicle, storage means for storing the data, a portable data link for extracting the data from the vehicle and a remote computer for analyzing the data and for providing print-outs for record keeping, maintenance and diagnostic purposes.

In U.S. Pat. No. 5,014,206 Scribner et al. teach a vehicle tracking system in which the position of a vehicle is measured on the occurrence of a predetermined event by receiving a transmission from a navigational transmitter (e.g., a GPS satellite), and the position data are stored in an on-board data collector for subsequent retrieval.

In U.S. Pat. No. 5,068,656 Sutherland teaches a system for monitoring and recording out-of-route mileage for long-haul trucks. His system uses two-way radio communication between a central office and the vehicle and uses on-board datalogging equipment of the sort that can report on vehicle activity after the vehicle returns to its base.

In U.S. Pat. No. 5,231,584 Nimura et al. teach a vehicular navigation system employing manually designated start and end points and using the end point of one segment of a trip as the start point of the next.

In U.S. Pat. No. 5,428,542 Liesveld teaches a system for recording the distance traveled by a vehicle for tax-reporting purposes. Lisveld's system provides audible prompting messages to the vehicle operator on the occurrence of a predetermined event (e.g., turning the vehicle's ignition switch on or off) and records the operator's spoken response, which comprise the odometer reading and the current time.

In U.S. Pat. No. 5,532,690 Hertel teaches a system for monitoring a vehicle moving within a designated area and for determining when the vehicle leaves the area.

In U.S. Pat. No. 5,543,802 Villevielle et al. teach a GPS system that stores way points in sequence so that a return route can be calculated. Their system provides for manually entered way points.

In U.S. Pat. No. 5,612,875 Haendel et al. describe a system for measuring distance traveled within a predetermined area, such as a state. Their system stores the entire boundary of a state in memory and measures miles traveled within that state so that a truck's license fees can be properly apportioned.

SUMMARY OF THE INVENTION

The invention provides a system and method for recording the distances traveled by and the places visited by a monitored vehicle equipped with a navigational receiver and a computer-based datalogger having a clock and an on-board memory so that the datalogger can store time-stamped records of the latitude and longitude of places visited by the vehicle. In some embodiments of the invention an input means is provided for the vehicle operator so that he or she can assign a label or location classification to ones of the places visited. Additionally, in some embodiments an administrator can use a central computer located at the vehicle's home base to assign labels to predetermined locations. Means are provided for communicating the set of time-stamped records to the central computer as well as for communicating any administratively assigned labels to the on-board datalogger. The central computer operates under software control to generate a map-like graphical output displaying a point corresponding to each of the places visited. In some embodiments the computer also displays the time spent at each of points visited during an operational period beginning when the vehicle leaves the home base and ending when the vehicle returns to the home base. A preferred display includes means of visually distinguishing between labeled and unlabeled points.

It is an object of the invention to provide a method of recording and accumulating the total number of miles traveled for business purposes during a predetermined reporting period. In accordance with the preferred method the vehicle operator labels each visited place that is visited for business purposes. Thereafter, the central computer calculates the miles driven between ones of the places visited for business purposes and between any one of the places visited for business purposes and the home base.

It is a further object of the invention to provide a method of monitoring the time spent at one of the visited places, or, alternatively, at each of a plurality of places visited during an operational period. It is a specific object of the invention to provide such a method that can serve as a time clock for use in billing time spent at a customer's location. It is also an object of the invention to provide a method of monitoring the time spent at unlabeled visited places so as to generate an exception report usable by management to account for non-worked time and to indicate possible use of the monitored vehicle for other than assigned tasks.

It is yet a further object of the invention to provide a means of measuring the total distance traveled by a monitored vehicle and communicating that measurement to a central administrator responsible for distance-based scheduled maintenance of the vehicle. It is an additional specific object to use the measured distance and elapsed time to determine an average speed of the vehicle during a monitored interval.

DESCRIPTION OF THE DRAWING

FIG. 5 is a tabular presentation of some of the data displayed in FIG. 4

DETAILED DESCRIPTION OF THE PREFERRED EMBODIMENT

Figure 1:
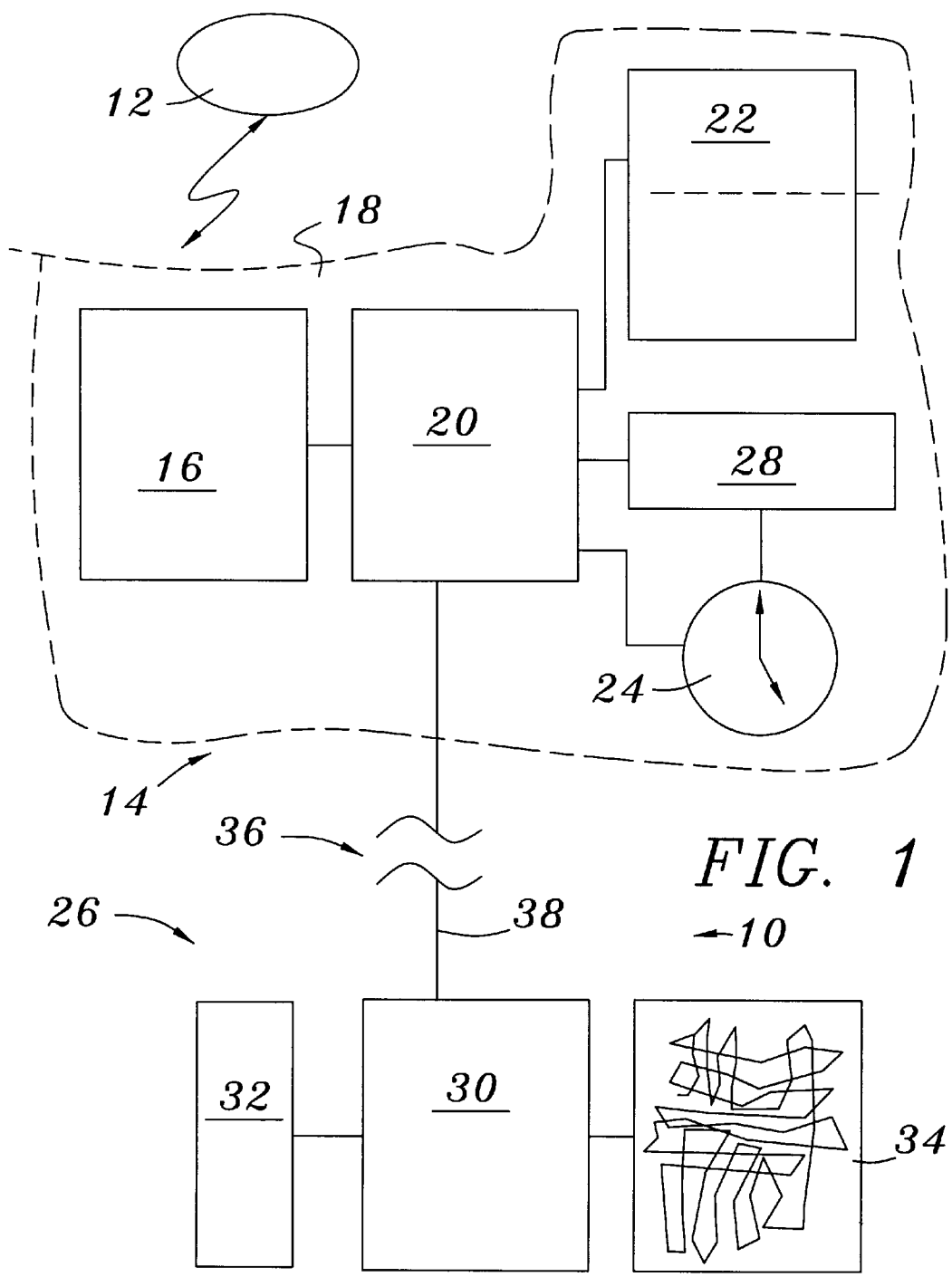
FIG. 1 is a schematic block diagram of a system of the invention.

A system of the invention 10 comprises a navigational transmitter or transmitters 12, which are preferably satellites comprising a portion of the Global Positioning System (GPS), but which may also be LORAN transmitters, local low power radio transmitters or the like. Signals, which commonly comprise both a positional and a temporal component, are received and stored by the on-board portion 14 of the system 10. A monitored vehicle 18 carries the on-board portion 14, which is preferably adapted to include a navigational receiver 16 made by either the Trimble Company or by the JRC Corporation. An output from the receiver 16 is supplied to an on-board computer 20 (which preferably comprises an Intel Model 80C186 microprocessor) having on-board memory 22, a manual input means 28 and optional timekeeping means 24 operatively associated therewith. It may be noted that in the preferred embodiment, in which the GPS navigational system is used, the system can rely on the time code portion of the GPS signal when generating one of the time-stamped records of latitude and longitude stored in the log file. In this case, the time-keeping means 24, while conventionally a portion of commercially available computer motherboards that may be selected for the on-board computer 20, is not necessarily involved in the routine data collection process. On the other hand, if the system uses a different navigational system that does not provide a time code, then the separate time-keeping means is necessary. The manual input means 28 of the preferred embodiment may comprise a keyboard or keypad (if detailed labels are to be supplied by an operator, as disclosed hereinafter) and a dump button (used during off-loading of data as will be hereinafter disclosed). Alternately, the manual input means 28 may comprise a dump switch and a separate way point indication button used to designate a visited site without providing detailed information associated therewith.

Another portion 26 of the system 10, hereinafter referred to as the fixed base portion, is commonly located at a garage, motor pool, or other home base of the monitored vehicle's 18 operations. The fixed base portion 26 comprises a base computer 30 (which is preferably one of many desktop computers of the type commonly referred to as "Wintel" that run under a version of the Windows® operating system supplied by the Microsoft Corporation). The base computer 30, as is conventional in the art, has a non-volatile memory 32 operatively associated therewith, and supplies an output to a graphical display device 34, which is preferably a laser printer communicating with the base computer 30 according to the widely used HP Laserjet III protocol, but which may be any of wide range of devices suitable for performing the functions hereinafter described.

A communication means 36 is provided for transferring data and instructions between the on-board 14 and base 26 portions of the system 10. In a preferred embodiment, the communication means 36 may comprise a cable 38 temporarily connecting a serial port portion of the on-board computer 20 with a serial port portion of the base computer 30 only at those times when data transfer is to occur—e.g., when the monitored vehicle 18 is parked at the fixed base. Other communication means known in the vehicle monitoring arts may also be used. These include, inter alia, transmission of radio waves or pulsed visible light or near-infrared beams from fixed base and on-board transceivers, and the physical transfer of a data bearing record between the two portions of the system.

Figure 2:
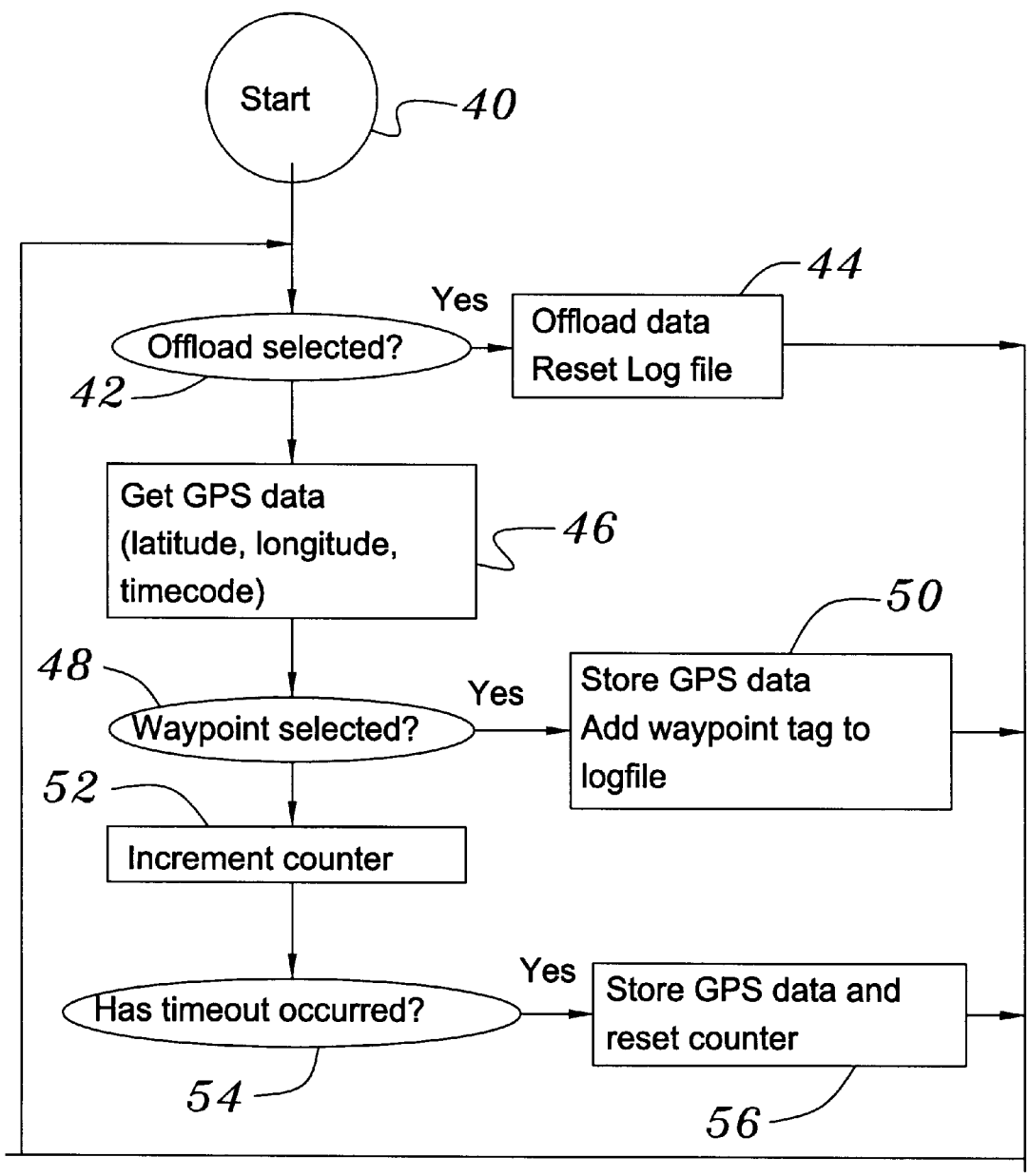
FIG. 2 is a flow chart showing processes carried out by the on-board datalogger portion of the system

An overview of the operation of the on-board portion 14 of the system is schematically depicted in the flow chart of FIG. 2. After a start and initialization step 40 an endless loop operation begins by checking to see (Step 42) if data are to be communicated to the base computer 30. If so, the data are uploaded and the log file is reset in Step 44. The log file, stored in the on-board memory, contains a plurality of time-stamped records. In a preferred embodiment, at least two types of time-stamped records are stored in the log file. A first, location, record comprises location data (e.g., latitude and longitude) and the time at which the location data were collected. As is well known in the navigation systems art, a sequential collection of records of this sort can be collected at regular time intervals, or regular distances along the path of travel (e.g., as determined from an odometer), and can be used to calculate the route followed by the vehicle 18. A second, waypoint, record comprises a waypoint selection datum and the time at which that datum was stored, and may also comprise additional manually input textual data that the operator of the monitored vehicle wishes to have associated with that visit to that waypoint. It will be understood that a waypoint record could also include location data, if desired. If the location records provide a fine enough temporal or spatial resolution, the location data may be omitted from the waypoint records.

It will be understood by those skilled in the data collection arts that program updates and the like may be supplied by the base computer to the on-board computer at the time of uploading. In the interest of clarity of presentation, this is omitted from the depiction of FIG. 2. Moreover, it will be recognized that resetting the log file is a matter of convenience and that other approaches (e.g., providing a fixed memory capacity for data in the log file and discarding the oldest data present as required to prevent overflow, and also tracking, in the base computer, the timestamp of the newest datum previously retrieved from the log file) are well known in the art of periodically collecting time-stamped data from a repository thereof.

If the on-board computer 20 is not being commanded to upload data, it receives input from the navigational receiver 16 (Step 46) and then checks (in Step 48) to see if the operator of the monitored vehicle is indicating, by the manual input means 28, that the vehicle is at a way point, which is expected to usually be a location at which some sort of business dealing (e.g., a sales call or a product delivery) is to occur. If so, the time-stamped location data and the waypoint selection datum are stored in the log file. If not, a counter is incremented (Step 52) and a timeout value is checked (in Step 54) to see if a maximum predetermined interval between data collection instants has been attained. If the predetermined data collection interval has expired, then the location data are stored (Step 56) in the log file and the interval counter is reset. It will be recognized that this process of collecting data when a predetermined event occurs, or, alternately after a predetermined interval during which no predetermined event occurs is well known in the art, and that although the explanation supra invokes a "counter" this function is conventionally provided by software programs running in the on-board computer. As will be hereinafter disclosed with particular reference to a use of the system of the invention to monitoring performance of a vehicle operating on a fixed route (e.g., a municipal bus), the manual input means 28 may be removed from the vehicle subsequent to an initial trip in which waypoint data were entered.

Figure 3:
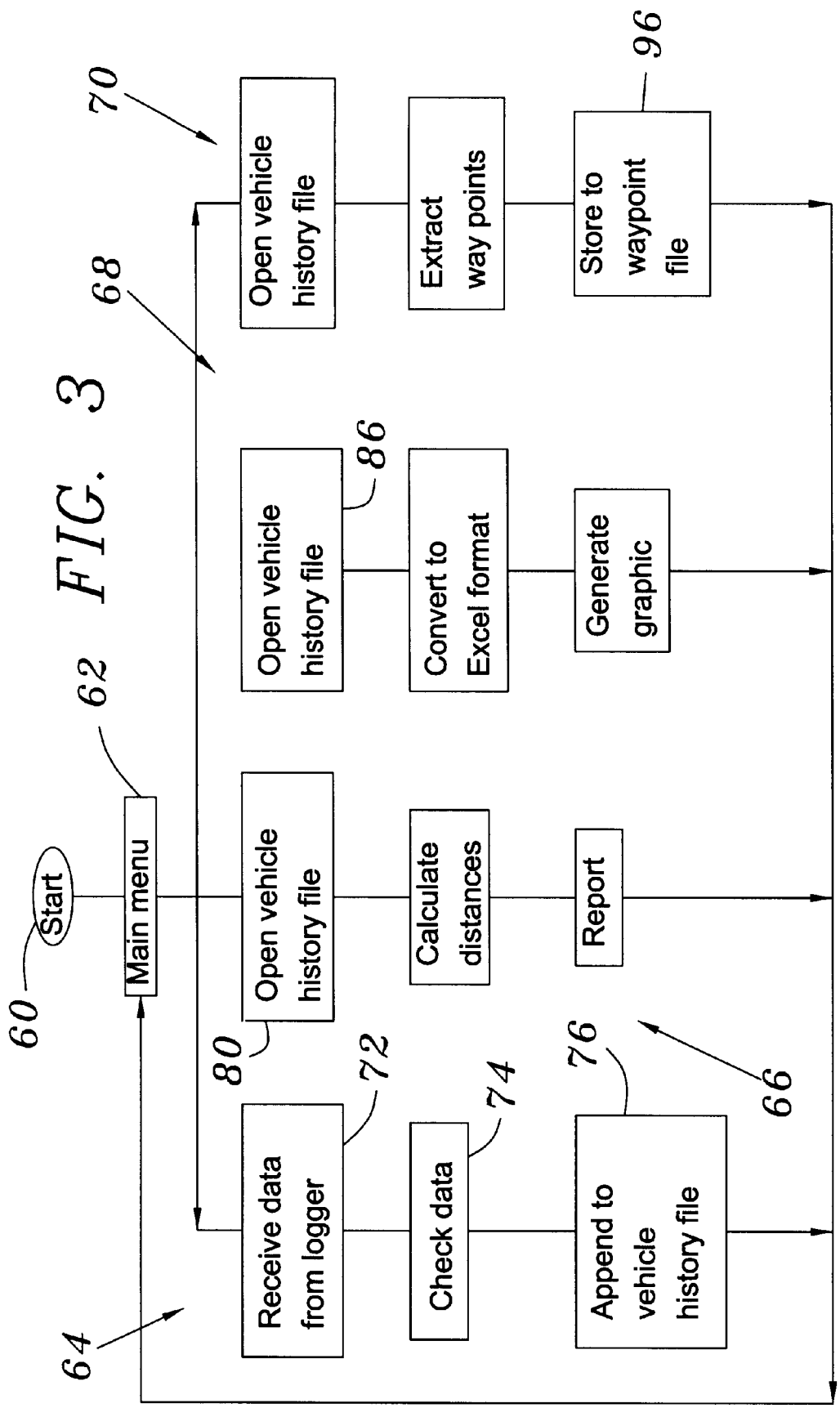
FIG. 3 is an overall flow chart showing processes carried out by the fixed base portion of the system

The data from the monitored vehicle 18 (or from a plurality of monitored vehicles if the system 10 is used in a fleet operation) are processed by the base computer 30 generally in accordance with the flowchart depicted in FIG. 3. After the computer is started (Step 60) a main menu (62) for the vehicle monitoring system is selected by the base computer user (it is expected that other data and word processing operations may be conducted on the same computer, and that the bundle of operations herein described will be manually selected). From the main menu 62 the base computer user may select one of several principal processes 64, 66, 68, 70. In an initial data collection process 64 the data are received from the on-board computer (Step 72), checked for errors (Step 74) and appended to an appropriate vehicle history file (Step 76). One such vehicle history file is maintained for each monitored vehicle, and generally contains the data found in the corresponding on-board log file, as well as earlier historical data. In an embodiment of the system in which a vehicle operator may enter additional data pertaining to a given visit to a customer (e.g., a sales call report), those additional data may be stored separately so that the vehicle history file would contain historical data from which it could be determined when and how frequently the salesman visited that customer, but would not contain the call report data which would be processed by other means.

A distance traveled process 66 opens the vehicle history file (Step 80) and calculates the distance between points at which the monitored vehicle's latitude and longitude were stored. As is known in the navigational system arts, the degree to which this calculation of an "as the crow flies" distance accurately represents the distance actually traveled by the monitored vehicle moving over established roads depends on the time between samples—e.g., on the length of the predetermined interval after which GPS data are logged if there has been no waypoint datum entered. Making this interval smaller improves the accuracy of the approximation at the cost of additional computer storage, longer data communication times and increased data processing time in the base computer. Both the distance calculations and the tradeoffs are well known in the art. It will be understood that the average speed at which the monitored vehicle traveled in going from one of the set of points to the next sequential point can be determined from the calculated distance and the difference in the times at which the respective longitude and latitude data were stored.

A preferred system of the invention employs a graphic generation process 68 to provide either the vehicle operator or a vehicle administrator with a map-like historical presentation of the history of the monitored vehicle's travels during a predetermined period (e.g., a day's operation, or a one-month reporting period). In a preferred approach to carrying out this process the vehicle history file is opened (Step 86) and the data are imported into a spreadsheet program having a graphical output capability. In a preferred arrangement, Microsoft Corporation's Excel® spreadsheet (version 6.0 or higher) is used An important application of the system of the invention is that of recording the distance traveled by a vehicle for tax-reporting purposes. This can be of particular concern in cases where the vehicle in question is a private automobile that is used partly for business use and partly for the personal use of its owner and driver. In this case the owner of the vehicle must commonly provide documentation to the tax collecting authorities as to the distance driven for business purposes, and must provide a clear distinction between a trip made for business and trips made for other purposes. In a method of recording business distance traveled, a small business owner who made repeated business trips among a plurality of client locations and who also used his vehicle for personal use would initially identify his or her home base location to the measurement system. Subsequently, he or she would use the input means 28 (which in this case could be a simple momentary contact pushbutton switch) to designate that a given location at which the vehicle stopped for greater than a predetermined minimum interval was a place at which business was transacted (e.g. a customer's premises) and was one terminus of a business trip. Locations where the monitored vehicle stopped (e.g., when the engine was turned off, or when a separate speed sensor (not shown) indicated a stop, or when a plurality of navigational fixes indicated that the vehicle had remained at the same location for some predetermined interval), but at which the designation button was not actuated would, of course, also be available from the log file. For example, if a ignition sensor is used by the system a "stop record", can be written into the log file. In what is expected to be the more common situation, in which no separate stop-indicating sensor is employed, a sequence of location records associated with the same location (within the precision of the system) would be indicative of a non-waypoint stop. On returning to the home base the user could employ the base computer to generate a graphical display from the vehicle history file, and could then manually label the ones of the heretofore unidentified designated sites that were visited for business purposes At the end of a reporting period (e.g., weekly or monthly) the distance-traveled algorithm 66 would be invoked to identify all business trips (i.e., those having a designated waypoint as one terminus and either a second designated terminus or the fixed base as the other terminus), calculate the distance for each such trip, and accumulate and report the total distance traveled for business purposes In another important use of the invention, either or both of a time-clock function and out-of-route stop monitoring can be performed by an administrator who may or may not be a vehicle operator (e.g., the owner of a small business that has one ore more employee-operated service vehicles making calls at customer-specific locations). Because the time at which the monitored vehicle stops at a location and the time at which it leaves are both known the base computer can calculate the time spent at the location from the vehicle history file. Thus, the billable time spent at customer service location (e.g., by an air conditioning repair technician) can be reported by the system and used as either an accuracy check on manually entered time records kept by the employees involved or as a primary means of accumulating billable time to a customer during a billing period. Moreover, because the system informs the administrator of all stopping periods regardless of whether they have been labeled or not, the administrator can discover and investigate out-of-route stops made by the monitored vehicle. For example, a pest control company could use the system of the invention to identify an employee's unauthorized use of the company's vehicle and supplies in a sideline business in which the employee pocketed all the unreported revenues.

Figure 4:
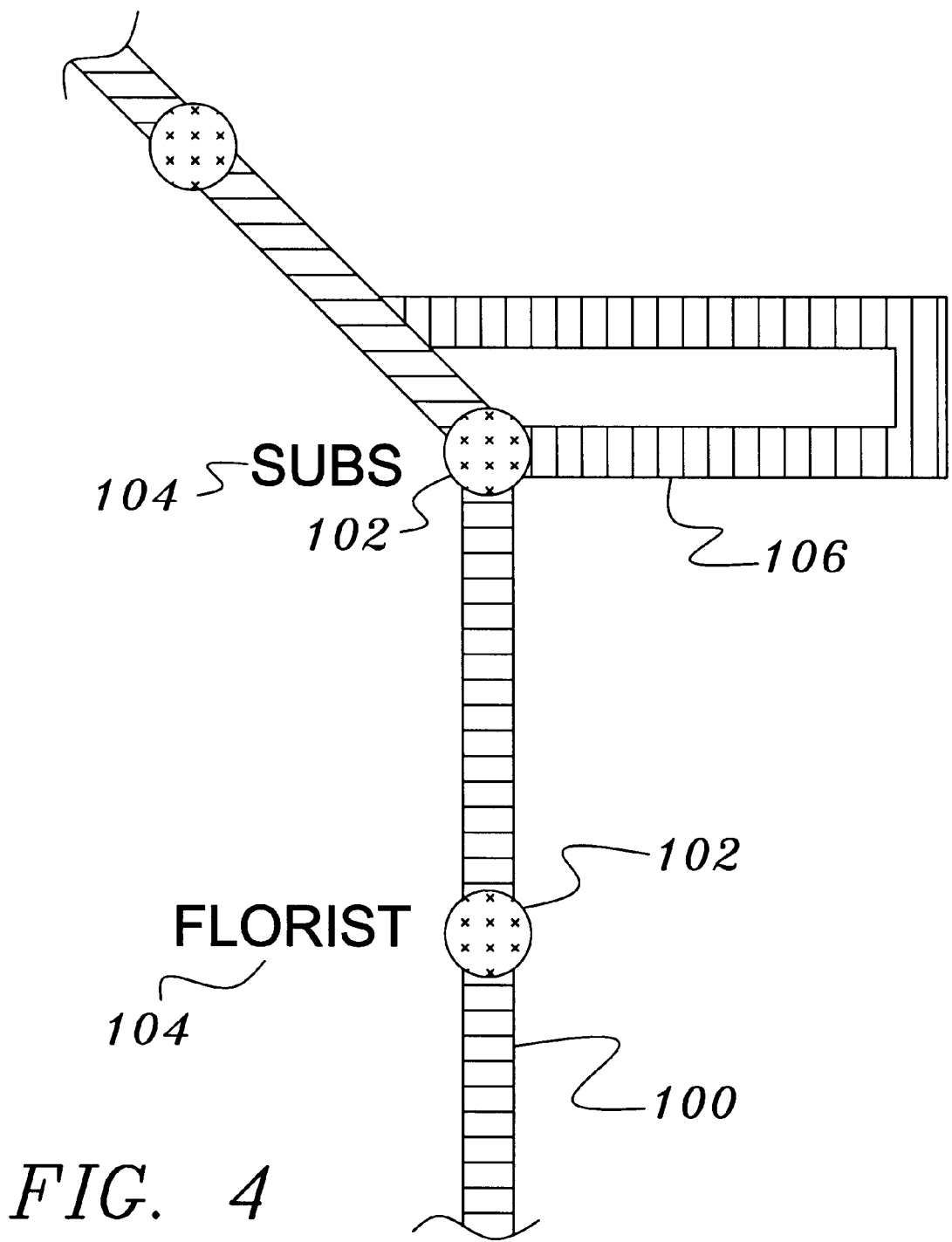
FIG. 4 is a map-like display of a monitored vehicle's travel history wherein some locations visited are labeled and others are not

Turning now to FIGS. 4 and 5 of the drawing one finds an example of a use of the system of the invention to track a vehicle that is expected to travel along a predetermined route 100 according to a preset schedule. In an initial, calibrating, run along the route 100 the on-board computer 20 is equipped with a keyboard that a trusted supervisor uses to denote waypoints 102 (which may be locations where the vehicle is to stop, or which may be intervening points if there is a long distance between two adjacent stops) and to supply each waypoint with a mnemonic label 104. a trusted supervisor On returning to the home base, the calibration data are transferred to the base computer 30 and the measured time between stops or waypoints may be then used to generate a list of minimum and maximum expected durations for each part of the route 100. On subsequent trips the manual input means 28 is removed from the on-board portion 14 of the system, and each such trip results in the accumulation of an on-board data file of time-stamped latitudes and longitudes (e.g., as shown in the three columns on the left of FIG. 5). At the conclusion of each trip the respective data file is transferred to the base computer 30 where the data are analyzed. In a first pass analysis, for example, one can elect to display the standard route in one color (e.g., blue) and display a locus of points that are off the route 106 in another color (e.g., red), to flag all the off-route points, and to copy the flagged points into another file for additional analysis— e.g., a search within the file of flagged data for unauthorized off-route stops as indicated in FIG. 5 for the data covering an interval from 10:16 to 10:43.

Data collected from a vehicle may also be displayed on a map. In one approach to this, the system can be configured to read the collection of time-stamped position data into existing GPS mapping software at a speed that is about fifty to sixty times faster than the actual data collection time (e.g., one point per second instead of one per minute). This approach, which requires map data stored on a CD-ROM or other high capacity storage medium, is desirable if considerable detail is needed or if various levels of detail are to be displayed during the analysis (e.g., zooming into a selected portion of the map). In other cases where repeated analyses are to be done on a single map, other map-overlay approaches (e.g., using Excel® to display the single map as "wallpaper" with two fixed data points tied to points on the map) can allow for operation with relaxed requirements for data storage capacity.

Time-clock and out-of-route stop monitoring operations are most likely to be carried out when more than one vehicle is being monitored. Moreover, operations of this sort may be carried out to ensure that each operator of a company vehicle complies with the management policies and directives of the company. Because the presence of a monitoring device in or on a company vehicle is expected to be known to the operator and to be present for a well known monitoring purpose, it is expected that the mere presence of the on-board monitoring unit will be adequate in many circumstances to remind the employees of what things are to be or not be done. Therefore, it is expected that in some cases a monitoring system comprising the systems and methods hereinbefore disclosed may also comprise one or more dummy on-board units having the outward appearance of a genuine unit.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

We claim:

1. A method of measuring a distance traveled in a trip of a first type by a vehicle having a fixed base, the vehicle carrying monitoring equipment comprising a navigational receiver for receiving a location datum at each of a plurality of times and means of storing a plurality of location records, each record comprising one of the location data and the time at which it was received, in a log file, the method comprising the steps of:

(a) driving the vehicle away from the fixed base;

(b) storing in the log file, responsive to respective manual inputs provided by an operator of the vehicle, a plurality of time-stamped waypoint records, each waypoint record indicative of a terminus of one of the trips of the first type;

(c) returning the vehicle to the fixed base and communicating the records from the log file to a base computer;

(d) calculating from the communicated log file records, by means of an algorithm carried out by the base computer, a sequence of locations visited at which the vehicle stopped for longer than a predetermined minimum interval and a corresponding sequence of trip distances between sequential ones of the locations visited;

(e) labeling, as a trip of the first type, each trip extending between two sequential locations at which waypoint records were entered, or between one location at which a waypoint record was entered and the fixed base.

2. The method of claim 1 comprising the additional steps after step (e) of:

(f) storing the labeled trips of the first type in a vehicle history file;

(g) driving the vehicle from the fixed base a second time;

(h) stopping at one of the locations at which one of the waypoint records was previously generated;

(i) returning the vehicle to the fixed base and communicating to the base computer those log file records generated after the vehicle drove from the fixed base the second time;

(j) calculating from those log file records, by means of the algorithm carried out by the base computer, a second sequence of locations at which the vehicle stopped for longer than the predetermined minimum interval and a corresponding second sequence of trip distances between sequential ones of the stops (k) retrieving, from the vehicle history file, the set of locations at which a waypoint had been designated on the prior trip;

(l) repeating step e).

3. The method of claim 1 further comprising the steps, after step (e) of:

(f) labeling, as a trip of a second type, each trip not labeled as a trip of the first type;

(f) generating, by means of a second algorithm carried out by the base computer, a graphic representation of the sequence of locations visited, the graphical representation depicting each of the trips of the first type in a first graphical fashion, the graphical representation depicting all trips of the second type in a second graphical representation.

4. The method of claim 3 wherein the first graphical representation comprises a line having a first color and the second graphical representation comprises a line having a second color.

5. The method of claim 1 wherein, in step (d) the algorithm also generates a visit-time file comprising the time greater than the predetermined interval that the vehicle was at each of the waypoints.

6. The method of claim 1 wherein step (b) further comprises storing, in the log file, textual data generated by the input means.

7. A method of measuring a duration of a visit to one of a plurality of predetermined locations previously visited by a vehicle having a fixed base, the vehicle carrying monitoring equipment comprising a navigational receiver receiving a location datum at each of a plurality of times and means for storing a plurality of location records, each record comprising one of the location data and the time at which it was received, in a log file, the method comprising the steps of:

(a) generating a vehicle history file comprising a plurality of records, each vehicle history file record comprising a datum representative of a respective one of the predetermined locations;

(b) driving the vehicle from the fixed base to the one of the predetermined locations and remaining at the one of the predetermined locations for longer than a predetermined interval;

(c) returning the vehicle to the fixed base and communicating the records from the log file to a base computer;

(d) calculating as the duration of the visit, from the communicated log file records, by means of an algorithm carried out by the base computer, the time greater than the predetermined interval at which the vehicle remained at the one of the predetermined locations.

8. The method of claim 7 wherein the monitoring equipment comprises manual input means operable by an operator of the vehicle, step (b) of the method further comprising an actuation of the manual input means by the operator during the longer than the predetermined interval.

9. The method of claim 7 comprising the additional steps, after step (d) of:

(e) repeating steps (b) through (d) and thereby obtaining a second time longer than the predetermined interval at which the vehicle remained at the one of the predetermined locations;

(f) adding the second time longer than the predetermined interval at which the vehicle remained at the one of the predetermined locations to the first time longer than the predetermined interval at which the vehicle remained at the one of the predetermined locations.

10. The method of claim 7 comprising an additional step (b1), intermediate (a) and (c) of:

(b1) driving the vehicle to an unknown location that is not one of the predetermined locations and remaining at the unknown location for longer than the predetermined interval;

the method further comprising additional steps (d1) and (d2) subsequent to step (c) of (d1) calculating as a duration of a visit to the unknown location, from the communicated log file records, by means of the algorithm carried out by the base computer, the time greater than the predetermined interval at which the vehicle remained at the unknown location;

(d2) storing the duration of the visit to the unknown location in a memory associated with the base computer.

* * * * *